United States Patent

[11] 3,540,379

| [72] | Inventor | Jean Pomagalski<br>114 Avenue de l'Eygala, 38-La Tronche, France |
|---|---|---|
| [21] | Appl. No. | 712,779 |
| [22] | Filed | March 13, 1968 |
| [45] | Patented | Nov. 17, 1970 |
| [32] | Priority | March 15, 1967 |
| [33] | | France |
| [31] | | No. 98,980 |

[54] FASTENER FOR AERIAL CABLES
9 Claims, 9 Drawing Figs.

[52] U.S. Cl. ............................................. 104/202
[51] Int. Cl. .............................................. B61b 7/20
[50] Field of Search. ................................... 104/202, 207, 211, 212, 222, 224; 280/480

[56] References Cited
UNITED STATES PATENTS
495,843  4/1893  Shipp ........................... 104/202

FOREIGN PATENTS
60,321  11/1954  France ........................... 104/202

*Primary Examiner*—James B. Marbert
*Attorneys*—Robert E. Burns and Emmanuel J. Lobato ABSTRACT: This disclosure concerns a disconnectible fastener for coupling a charge to a moving cable of a transport or towing installation using an aerial cable, which fastener includes a lever pivoted on a gripping member offering to the cable two shoulder surfaces shifted in the longitudinal direction of the cable and surrounding it from above and below, characterized by the fact that the surface of the upper shoulder has a jaw offering to the cable two substantially plane lateral contact surfaces relatively inclined with respect to their vertical bisector, the surface of the lower shoulder espousing the lower part of the cable to force it into the jaw, the pivoting point of the lever on the gripping member being located above the cable behind the gripping piece relative to the forward movement of the cable.

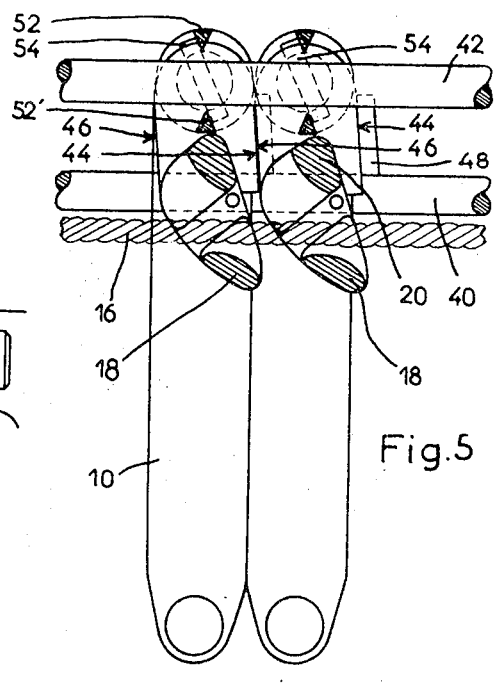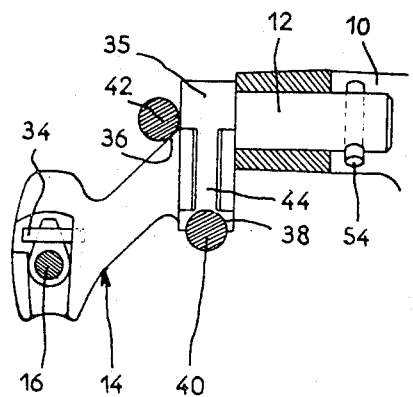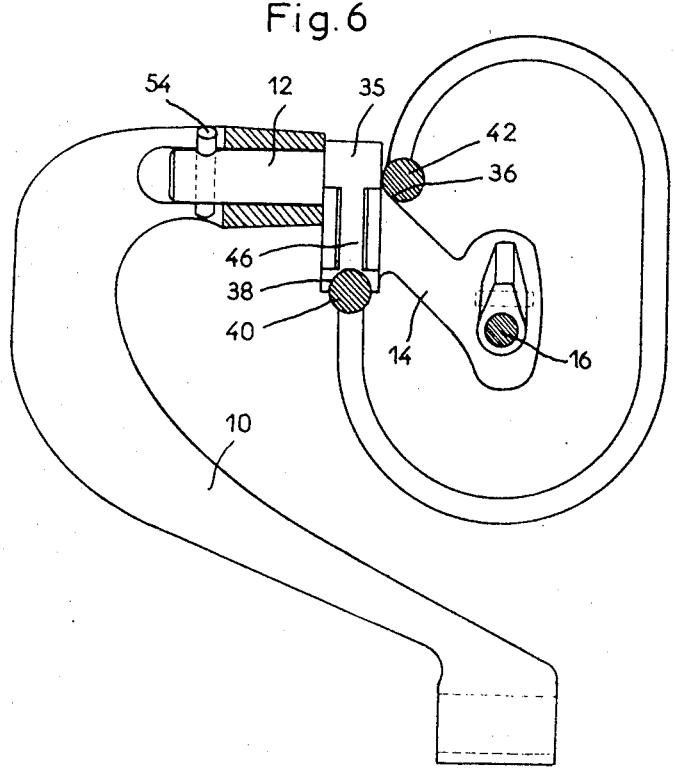

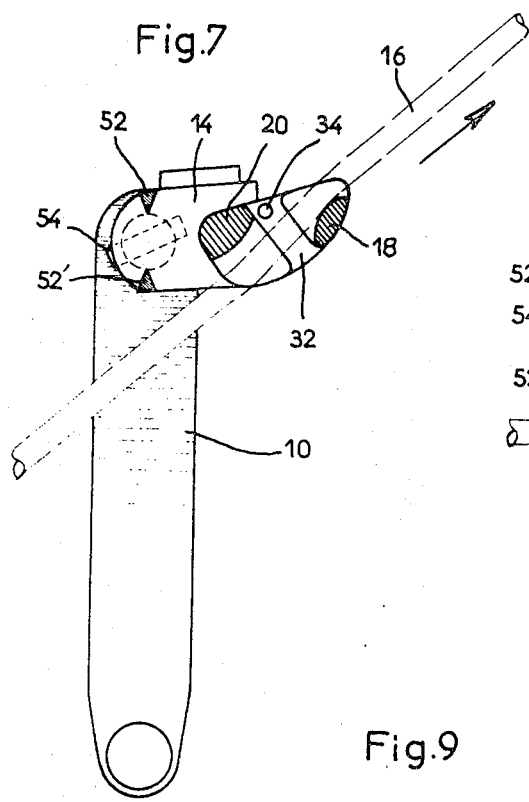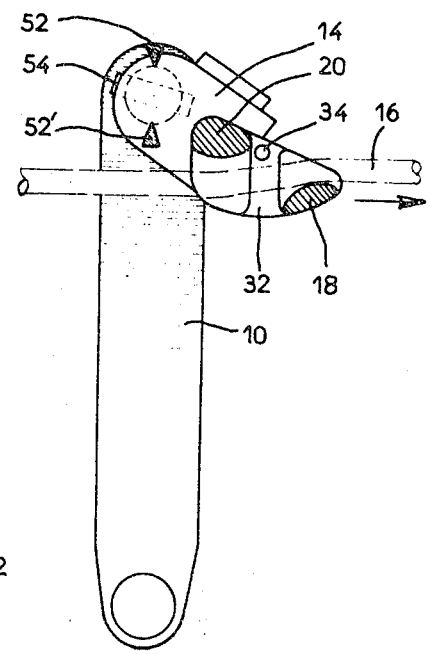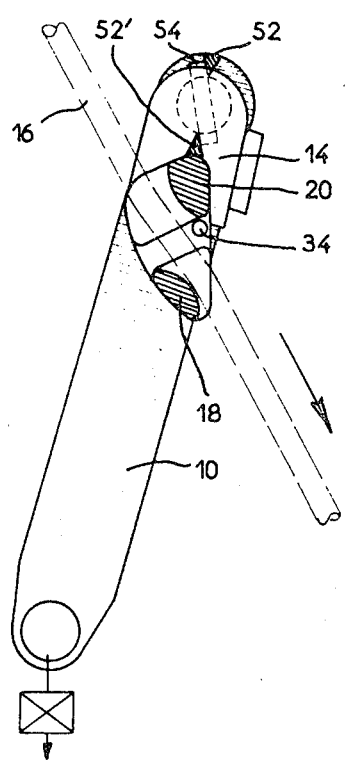

FASTENER FOR AERIAL CABLES

This invention relates to a disconnectible fastener for coupling a load to a moving cable of a transport or towing installation using an aerial cable, comprising a lever pivoted on a gripping piece offering to the cable two shouldered surfaces shifted in the longitudinal direction of the cable and surrounding the cable from above and from below, respectively.

Such disconnectible fasteners are well known in aerial cable installations, in particular for skiers, in which the charge pulled or carried urges the gripping member to pivot in order to wedge it on the cable. In these known devices it has been noted under certain conditions of use that there occurs sliding of the fastener on the cable and owing to this fact a certain wear in the contact surfaces of the gripping member and of the cable. Such sliding movements cause irregular driving movement, shocks, and certain accidents.

It has already been proposed to reduce the risks of sliding by increasing the friction between the contacting parts, for example, by providing on the contact surfaces of the gripping member more or less sharp edges which penetrate in the cable.

These devices damage the cable and even risk cutting it or causing serious hooking, and to resist excessive shocks it is often necessary to use a cable having excessive thickness.

The first object of the invention is to provide effective fastening of the fasteners on the cable, which will prevent all sliding but will not damage the cable.

The load exerts through the agency of a lever pivoted to the gripping member, a gripping couple thereon which wedges it on the cable. It is easy to see that the extent of this couple depends upon the angle formed between the pivoted lever and the gripping member and that accordingly the gripping couple is not constant on the whole of the path. In known devices it has been noted that under certain inclinations of the cable, for example, when passing on a supporting or turning roller or when going down, this couple became insufficient to prevent sliding of the fastener.

A second object of the invention is to arrange the parts in such a way that the wedging couple never becomes nil and is always sufficient to prevent sliding regardless of the traction effort required and of its direction.

The disconnectible fastener according to the invention is characterized by the fact that the surface of the upper shoulder surmounting the cable from above comprises a jaw, known per se, offering to the cable two substantially plane lateral contact surfaces slightly inclined relative to their vertical bisector plane, the surface of the lower shoulder espousing the lower part of the cable to force it in said jaw, said pivoting of said lever on said gripping member being located above the cable.

The cable which is urged into the jaw for gripping is not subject to any shearing effect since it is inserted in the jaw as in the groove of a pulley. By positioning the pivot point of the lever above the cable the gripping couple will be maximum when the cable will be inclined in the direction of the slope.

According to a first embodiment of the invention a stop limits the free pivoting of said lever on said gripping member for a rotational direction in such a way that said lever continues to exert a gripping couple on said gripping member of the fastener connected on the cable for a strong downward slope.

Accordingly positive driving of the fasteners is also assured in the downhill direction.

According to another embodiment, the outer surface of the fastener is streamlined in such a way that the cable may be guided by rollers of a small diameter.

One of the drawbacks of installations using disconnectible fasteners is to require supporting pulleys having a large diameter in order to permit passage of the fasteners. The streamlining of the fastener renders possible the use of pulleys having a small diameter which simplifies the entire installation.

Additionally, the streamlining permits a very smooth passage without vibration in the grooves of the pulleys, a characteristic which is indispensable in the carrying of passengers.

Other characteristics and advantages which will appear from the following description of an example of the invention given by way of non limiting example and shown in the accompanying drawings in which:

FIG. 4 is a view taken on the right of FIG. 1 showing the gripping member in disconnected position, the pivoted lower lever being shown partially in cross section;

Figure 1:
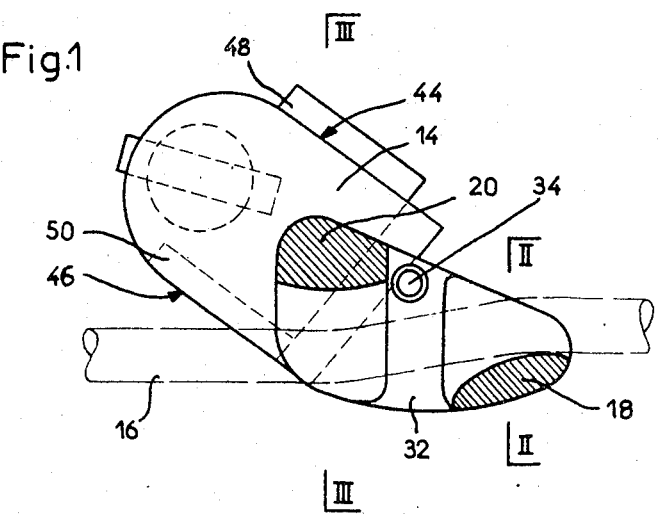
FIG. 1 is an elevational view in cross section according to its vertical plane containing the cable of a gripping member in work position of a disconnectible fastener according to the invention.

FIG. 5 is a partial schematic elevational view of the disconnecting post of the installation, FIG. 6 is a profile view of the device according to FIG. 4, but seen from the opposite side, FIG. 7 is a view similar to FIG. 1 showing the fastener connected to a rising cable, FIG. 8 shows the device of FIG. 7 cooperating with a horizontal cable, FIG. 9 shows the device of FIG. 7 cooperating with a descending cable.

On the FIGS., a load (not shown) is connected to a lever 10 pivoted on a crank 12 carried laterally by gripping member 14 capable of attaching on the aerial cable 16 of a towing installation (not shown). Gripping member 14 has two shoulders 18, and 20 grooved and longitudinally spaced one of which 18 surrounds cable 16 from below and the other 20 from above. Grooved shoulder 20 interposed between shoulder 18 and connection 12 has a groove 22 (see FIG. 3) whose inclined flanks 24, 24' rest on cable 16 and exert a gripping force thereon. The angle formed by surface 24, 24' constituting the flanks of groove 22 is relatively small in order to obtain a considerable gripping force even if the force pushing cable 16 into groove 22 is not great.

This angle with the bisector will be, for example, of a maximum of 15° and preferably of about 7°.

Surfaces 24, 24' are not completely plane, but are, for example, portions of sectors of truncated cones in order to offer to cable 16 slightly incurved surfaces.

Cable 16 then bears on the entire length of shoulders which follow a curved line which can be the arc of a circle of large radius (FIG. 1). The inlet and outlet edges of groove 22 are naturally rounded to avoid all sharp edges.

Owing to the incurved condition of cable 16 lying in groove 22, the same is not subject to any breaking stress or local overstress which would decrease its resistance.

In order to emphasize this essential characteristic, it is possible to compare segment 20 to a sector of a pulley having a large diameter, and having a V-shaped groove of which the angle made by the cheeks of the groove is very small, for example, of about 14°.

Figure 2:
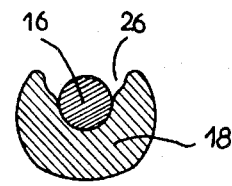
FIG. 2 is a cross section taken along line II–II of FIG. 1.

Segment 18 of gripping member 14 which surrounds cable 16 from below is also grooved at 26, the bottom of groove 26 being semicylindrical and of the same dimension as cable 16 and the upper exit of groove 26 being flared (see FIG. 2).

The inlet and outlet edges of segment 18 are also rounded for the reasons mentioned above. Segment 18 of gripping member 14 is unable to become wedged on cable 16 because of the shape of groove 26 and its purpose is to form a support for the lever constituted by gripping member 14, to which a force is applied by a pivoted lever 10 which pushes and wedges segment 20 on cable 16. This configuration of segment 18 is dictated by the fact that in order to pass on small rollers which support the cable, the thickness of this segment on its underside must be small.

Figure 3:
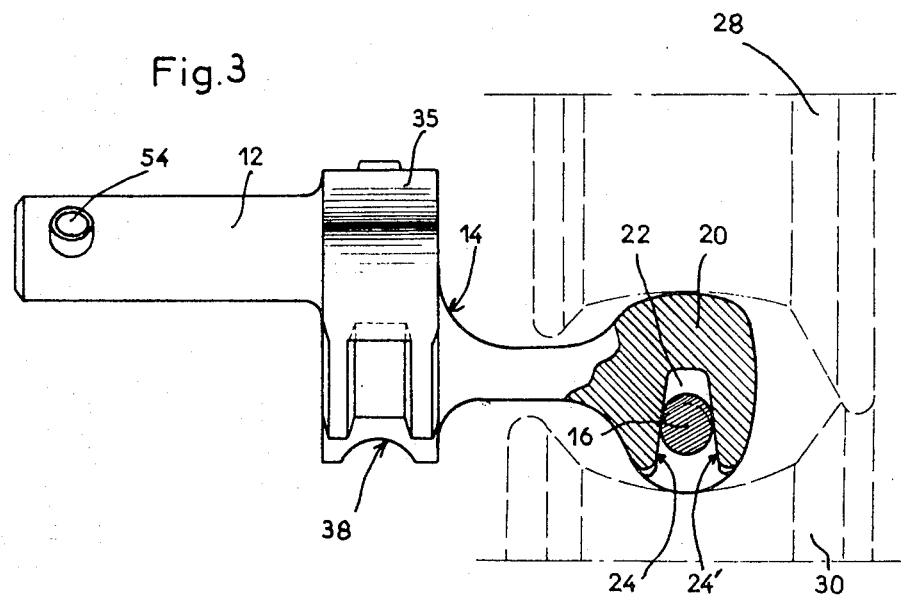
FIG. 3 is a view taken on the left of FIG. 1, showing the gripping member in profile view in partial cross section taken along line III–III of FIG. 1. The dotted lines schematically represent profiles of rollers.

The outer surfaces of segments 18 and 20 are profiled and have slanted forward surfaces to prevent shocks to cable 16 in rollers 28, 30 which support it or guide it and between which the fastener engages (see FIG. 3).

Between the two segments 18 and 20 which are longitudinally shifted relative to one another, is provided a slot 32 overlapping the arm perpendicular to grooves 26 and 22 in gripping member 14 on the face opposite that carrying crank 12. The width of this slot is equal to the diameter of cable 16 and through this slot 32 a fastener can be slipped on cable 16.

To avoid an accidental fall of the fasteners, there has been provided a pin 34 which limits at one spot the width of slot 32 which locks the fastener on the cable.

Gripping member 14 has on support 35 of crank 12 guiding surfaces 36 and 38 which are laterally shifted relative to segments 18 and 20 to form jaws.

Guiding surface 38 is, for example, constituted by a groove made in the lower surface of support 35 which makes an acute angle with the general direction of blocking grooves 26 and 22.

The cross section of groove 38 is preferably semicylindrical. At the stations of the towing device are provided guiding rails 40, 42, partially shown in FIGS. 4 to 6, for example, of cylindrical cross section, which cooperate, one 40 with the guiding roof 38 and the other 42 with the guiding surface 36. Rails 40 and 42 are secured in any way (not shown) parallel to cable 16 and they extend along a path which corresponds to the path travelled by the fasteners when disconnected. Their facing corresponds to that of guiding surfaces 36, 38 and owing to this fact they give to gripping member 14 engaged there between a well defined position in which groove 38 of member 14 is also parallel to cable 16 (see FIG. 5).

The position of groove 38 relative to segments with jaws 18, 20 is arranged in such a way that in the position of member 14 dictated by way of 40, 42 cooperating with support 35, groove 26 and groove 22 of segments 18, 20 are both raised and freed from cable 16.

It is easy to see that cable 16 when in movement has sufficient play in the upper flared part of groove 26 of segment 18 to pass without rubbing against gripping member 14 and accordingly without driving the same. The disconnection of the fasteners takes place automatically as soon as they engage between rails 40, 42. The selected fasteners pile up side by side on rails 40, 42.

It will be advantageously provided, for example, on support 35, stop surfaces 44, 46 parallel and which come in contact during the coming together of the piled fasteners and owing to this fact gives a perfectly parallel position thereto determined by a different gripping member 14. The guiding effect can be increased by providing on one of the surfaces 44 a rib 48 and on the other 46 a complementary groove 50, which, by fitting into one another render unitary all the piled up fasteners.

In the embodiment shown in the FIGS., crank 12 for pivoting lever 10 is located behind the segments with jaws 18, 20 relative to the direction of cable 16 indicated by an arrow in the FIGS.

A force applied to lever 10 exerts on gripping member 14 which has the shape of a lever, a couple in a trigonometric direction pending to push cable 16 in groove 22. In connected position of gripping member 14, crank 12 is above cable 16 and gripping member 14 forming a lever making an angle near 30° to 40° with cable 16.

It can easily be seen that the tightening couple is maximum for the given load when pivoted lever 10 is perpendicular to lever 14 forming the gripping member, position shown in FIG. 7 which corresponds to a cable ascending at an inclination of about 30° to 40°. This couple varies sinusoidally in proportion with said angle and its variation is relatively small for a rather considerable range of angles, in particular for a horizontal cable 16 shown in FIG. 8, the effective lever arm is very near maximum. FIG. 9 shows an extreme case in which cable 16 is in a very sharp downward slope.

It appears clearly from the drawing that the pivoted lever 10 which is practically aligned with gripping lever 14 grips to pass the deadpoint of these two levers 10, 14 and to exert an unblocking couple on gripping member 14.

Pivoted lever 10 carries stop 52, 52' which cooperate with a pin 54 passing through crank 12 of gripping member 14 in order to block the pivoting of lever 10 on lever 14 to prevent these levers from passing said aligning position which risks to cancel the gripping couple.

Under these conditions the load exerts through the intermediary of pivoted lever 10 and stops 52, 52' a gripping couple on member 14 (see FIG. 9).

The device of the invention operates in the following manner:

To fasten the fastener on cable 16 upon departure the same is taken out by usual means from the guiding rails and allowed to fall on the cable. Automatically, gripping member 14 places itself in connected position, gripping and wedging cable 16 between jaws 24, 24'. The lever couple, as described above, can never become null or change direction and is at a maximum for a cable following an ascending slope. The passage of guiding or support pulleys takes place smoothly thanks to the profile given to segments 18 and 20 and these pulleys can in no case exert on gripping member 14 a disconnecting force.

On the contrary, the pressure on a turn around roller of cable 16 adds to that exerted by pivoted lever 10.

The disconnection of the fastener takes place automatically upon coming in contact with guiding surfaces 36, 38 with rails 40, 42 which cause the raising or pivoting of the gripping member and free jaws 24, 24' and groove 26 from cable 16.

Naturally, the invention is not limited to the special embodiment described and shown but encompasses all modifications of details which remain within the frame of mechanical equivalence as indicated in the appended claims.

I claim:

1. A disconnectable fastener for coupling a charge to a moving cable, comprising a gripping member, a lever pivoted on said member, said member having surfaces shifted relative to one another in the lengthwise direction of said cable and engaging said cable from above and below, the upper of said surfaces comprising a jaw with two substantially planar lateral contact surfaces slightly inclined relative to a vertical bisector thereof, the lower surface being shaped so as to follow the lower part of the cable in order to force the same in said jaw to wedge the cable between said contact surfaces, said lever being pivoted on said gripping member above said cable and behind said gripping member relative to the direction of movement of said cable wherein all of the gripping force is applied by said jaw.

2. Fastener according to claim 1 having a stop for limiting the pivoting of said lever on said gripping member for a rotational direction such that said lever continues to exert a gripping couple on said gripping member when said fastener is on a strongly downwardly inclined cable.

3. Fastener according to claim 1 having a guiding surface cooperating with a fixed guide in order to cause pivoting of said fasteners at disconnection points in the direction of loosening of said fasteners on said cable, the said surfaces being shaped so as to permit free passage of a moving cable in a disconnected fastener.

4. Fastener according to claim 3, wherein said guiding surface comprises a semicylindrical groove cooperating with a fixed cylindrical guide.

5. Fastener according to claim 1 having complementary surfaces permitting stacking and positioning of the plurality of disconnected fasteners.

6. Fastener according to claim 1, having a locking member for preventing removal from said cable regardless of its relative position with respect to said cable.

7. Fastener according to claim 1, having a streamlined outer surface.

8. Fastener according to claim 1, wherein each of the substantially plane lateral surfaces included with said bisector makes an angle which does not exceed 15°.

9. Fastener according to claim 1, wherein each of said substantially planar lateral surfaces is a portion of a sector of a very flattened truncated cone.